United States Patent [19]

Horiuchi et al.

[11] Patent Number: 5,063,456
[45] Date of Patent: Nov. 5, 1991

[54] VIDEO SIGNAL PROCESSOR

[75] Inventors: Tadasu Horiuchi, Yokohama; Hideo Nishijima; Shoji Ohno, both of Katsuta, all of Japan

[73] Assignee: Hitachi, Ltd., Tokyo, Japan

[21] Appl. No.: 389,297

[22] Filed: Aug. 3, 1989

[30] Foreign Application Priority Data

Aug. 12, 1988 [JP] Japan .............................. 63-199829

[51] Int. Cl.$^5$ ............................................. H04N 9/79
[52] U.S. Cl. ..................................... 358/310; 358/147
[58] Field of Search ............... 358/310, 319, 147, 183, 358/311

[56] References Cited

U.S. PATENT DOCUMENTS

| | | | |
|---|---|---|---|
| 3,996,610 | 12/1976 | Kawamoto | 358/31 |
| 4,167,759 | 9/1979 | Tachi | 358/147 |
| 4,419,699 | 12/1983 | Christopher et al. | 358/340 |
| 4,517,598 | 5/1985 | Van Valkenburg et al. | 358/147 |
| 4,737,862 | 4/1988 | Koga | 358/329 |
| 4,786,978 | 11/1988 | Kawasaki | 358/329 |
| 4,802,023 | 1/1989 | Williams | 360/14.3 |
| 4,870,297 | 9/1989 | Karlock | 358/319 |
| 4,908,722 | 3/1990 | Sonobe | 360/46 |

*Primary Examiner*—Robert L. Richardson
*Assistant Examiner*—Thai Tran
*Attorney, Agent, or Firm*—Antonelli, Terry, Stout & Kraus

[57] ABSTRACT

A video signal processor suitable for use with a VTR, the processor being provided with a circuit for eliminating inserted information signals other than a time code at a stage prior to the addition of a time code signal to the vertical blanking period of a video signal, providing accurate time code reading in a VTR equipped with a circuit for recording or reproducing the time code signal.

3 Claims, 7 Drawing Sheets

FIG. 9 ns having been separated from the composite video signal so as to deliver the same to the controller 6. The

VIDEO SIGNAL PROCESSOR

BACKGROUND OF THE INVENTION

1. Field of the Invention

This invention relates to a video signal processor which is suitable for use in a video tape recorder for public use or the like, and specifically to a video signal processor which is suited to add or insert binary-coded signals such as time codes in a vertical blanking period and/or to read the same.

2. Description of the Related Art

Commercial video tape recorders already use time codes expressed by time, minutes, seconds and the number of frames which have been binary-coded inserted in a vertical blanking period of video signals to designate a tape location (address) by using such time codes. The term, "time codes" are generally called "VITC" (Vertical Interval Time Code). This has been introduced on, for example, pages 226 to 228 of the technical journal "VTR Technology" compiled by NHK (Nippon Hoso KyoKai).

As signals to be inserted in the vertical blanking period, codes or the like, which are indicative of the number of frames used for a character broadcasting or a laser disk, are used as an alternative to the VITC signal. In addition, plans to insert a reference signal for ghosting cancellation, i.e., a ghost canceller (which will hereinafter be called a "GCR") in the vertical blanking period, have been brought forward; practical testing for broadcasting purposes is already being conducted.

There are some cases, for example, where a period during which these information signals are inserted in the same period during which the time codes are inserted or is subsequent to a period during which the time codes are inserted within the vertical blanking. Accordingly, where it is desired to apply time codes to the video tape recorders or to the videotapes themselves for public use, there is a possibility of these signals being combined with those within the period of the vertical blanking. Consequently, there is risk of malfunction in time coded reading.

SUMMARY OF THE INVENTION

An object of this invention is to correct the above-described problems and to provide a video signal processor which permits a correct reading of time codes.

To solve the above-described problems, a means for eliminating information signals other than time codes, which are inserted in a vertical blanking period, is provided at a stage prior to a time-code addition means in an apparatus of such a type that the time codes are inserted in the vertical blanking period of video signals in the present invention.

As a consequence, all of the signals which have been inserted in the vertical blanking period or some of the signals which have a bad effect upon the time codes can be eliminated or erased from the video signals to be inputted. In addition, reading malfunctions due to other adjacent signals can be reduced by the addition of time codes after performance of the above elimination processing upon reading desired time codes alone from the video signals including the added time codes.

DETAILED DESCRIPTION OF PREFERRED EMBODIMENTS

Figure 1:
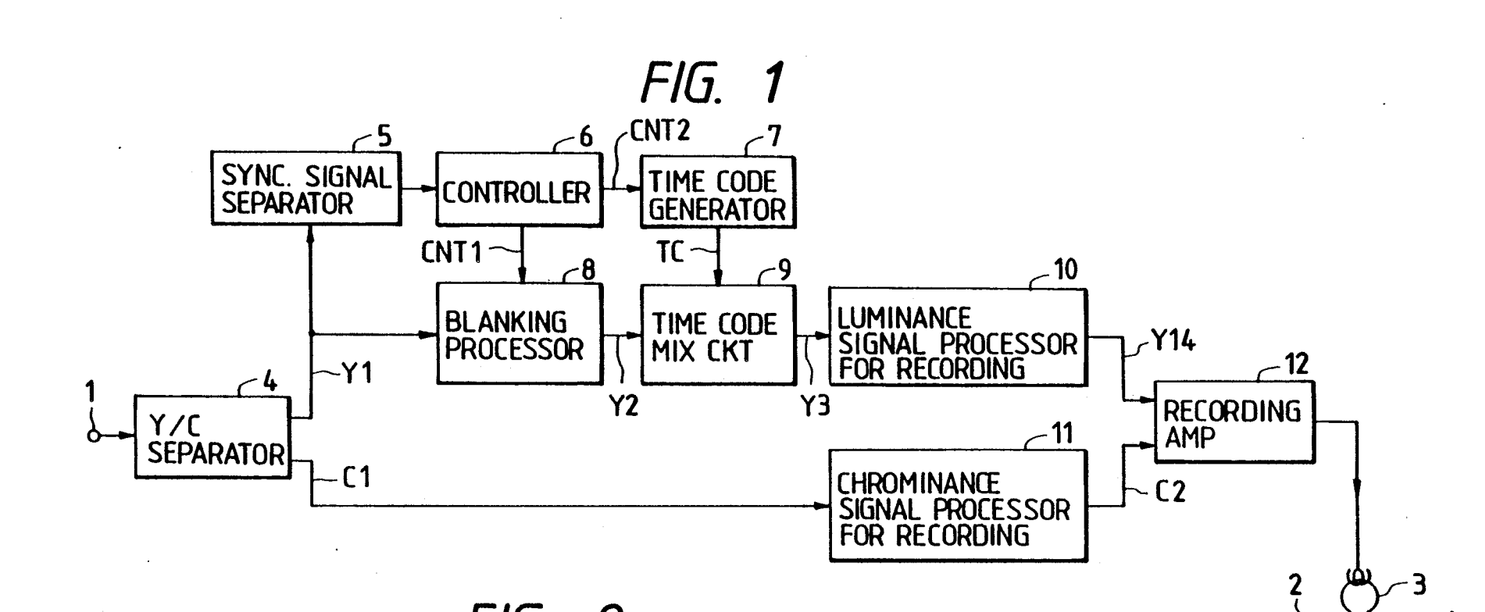
FIG. 1 is a block diagram of a video signal processor according to one embodiment of this invention.

FIG. 1 is a block diagram showing a video signal processor according to one embodiment of this invention.

Referring to FIG. 1, designated at numeral 1 is an input terminal for composite video signals while numeral 4 indicates a Y/C separator for separating a luminance signal $Y_1$ and a chrominance signal $C_1$ from the video signals received at the input terminal 1. A comb-shaped filter is used for the Y/C separator 4. Designated at numeral 8 is a blanking processor connected to the Y/C separator 4 for eliminating information signals added or inserted in a vertical blanking period. Numeral 5 indicates a sync signal separator responsive to the luminance signal $Y_1$ separated by the Y/C separator 4 for extracting synchronizing signals (a vertical synchronizing pulse and a horizontal synchronizing pulse) thereof from the composite video signals. Numeral 6 indicates a controller responsive to the synchronizing signals of the sync signal separator 5 for generating a control signal $CNT_1$ for blanking the blanking processor 8 during a prescribed interval and a control signal $CNT_2$ for controlling a time code generator 7. Designated at numeral 7 is the time code generator operative to generate a time code TC upon receipt of the control signal $CNT_2$ from the controller 6. Numeral 9 indicates a time code mix circuit for mixing an output signal $Y_2$ from the blanking processor 8 with the output signal (time code) TC from the time code generator 7. Designated at numeral 10 is a luminance signal processor for recording responsive to an output signal $Y_3$ from the time code mix circuit 9 and for obtaining a signal $Y_{14}$ suitable for recording, while numeral 11 indicates a chrominance signal processor for recording coupled to the Y/C separator 4 and for subjecting the chrominance signal $C_1$ to low-frequency conversion to provide a signal $C_2$ suitable for recording. Numeral 12 indicates a recording amplifier for amplifying the output signal $Y_{14}$ from the luminance signal processor 10 and the output signal $C_2$ from the chrominance signal processor 11, respectively, to supply the amplified signals to a video head 3. Designated at numeral 2 is a magnetic tape.

In the above-described construction, the composite video signals received at the input terminal 1 are supplied to the Y/C separator 4 and then separated into the luminance signal $Y_1$ and chrominance signal $C_1$ through the Y/C separator 4. The luminance signal $Y_1$ thus separated is supplied to the sync signal separator 5 and the blanking processor 8. The sync signal separator 5 separates the vertical synchronizing signal and horizontal synchronizing signal from the composite video signals so as to deliver the same to the controller 6. The controller 6 detects, based on these synchronizing signals, the vertical blanking period of the luminance signal $Y_1$ or a period out of the vertical blanking period, during which information signals are to be inserted. The controller 6 also generates the control signal $CNT_1$ for controlling the blanking processor 8 and the control signal $CNT_2$ for controlling the time code generator 7 during the period of this detection. The blanking processor 8 receives the control signal $CNT_1$ and then performs the blanking processing of information signals which have been inserted in the vertical blanking period of the video signals so as to output the signal $Y_2$ free of the information signals to the time code mix circuit 9. The time code generator 7 receives the control signal $CNT_2$ from the controller 6 and then produces a time code TC which is in synchronization with the control signal $CNT_2$. The time code mix circuit 9 mixes the vertical blanking period of the signal $Y_2$ with the time code TC. The signal $Y_3$ thus mixed is converted into the signal $Y_{14}$ which can be recorded through the luminance signal processor 10 for recording. On the other hand, the chrominance signal $C_1$ which has been separated by the Y/C separator 4 is converted into the signal $C_2$ which can be recorded by the chrominance signal processor 11 for recording. The signals $Y_{14}$ and $C_2$ thus obtained are recorded on the magnetic tape 2 through a recording head 3 via the recording amplifier 12.

Figure 2:
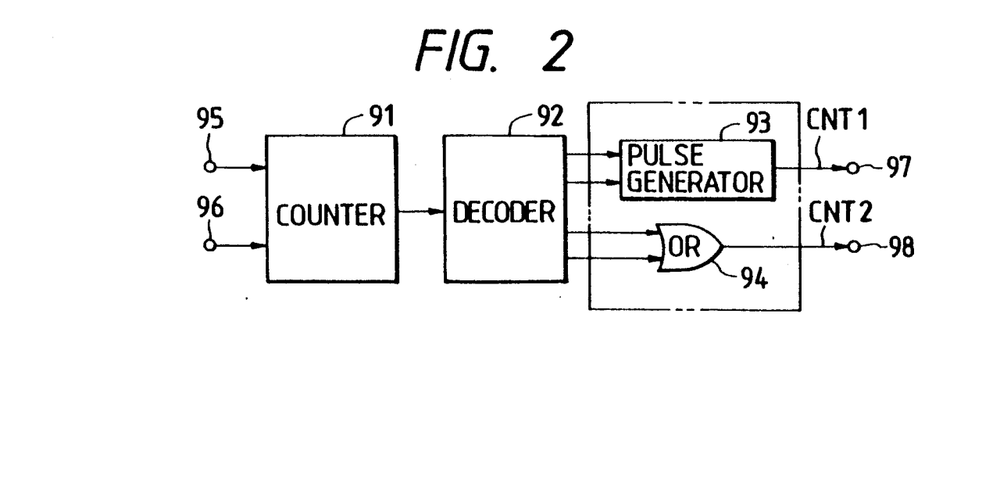
FIG. 2 is a block diagram showing one embodiment of a controller of FIG. 1.
Figure 3A:
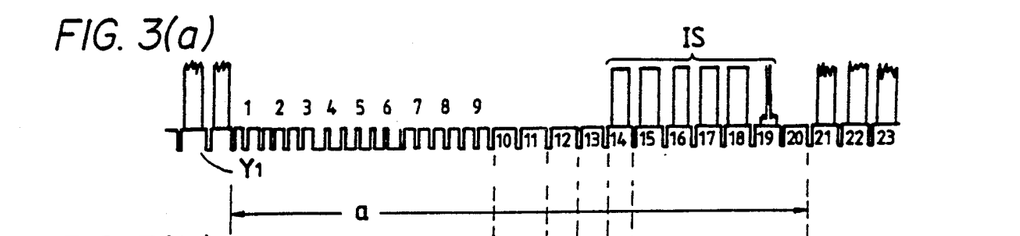
FIGS. 3(a)-(e) are timing charts for describing the controller of FIG. 1.
Figure 3B:
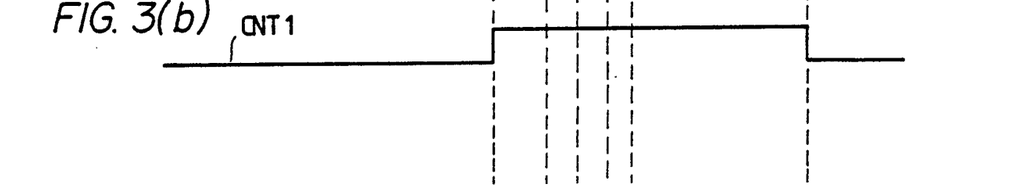
Figure 3C:
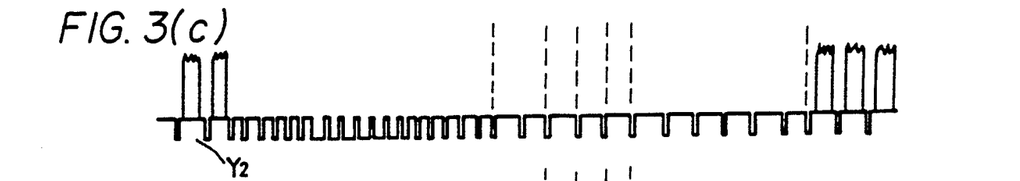
Figure 3D:
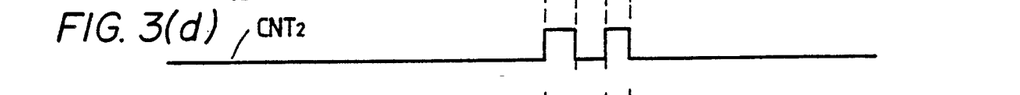
Figure 3E:
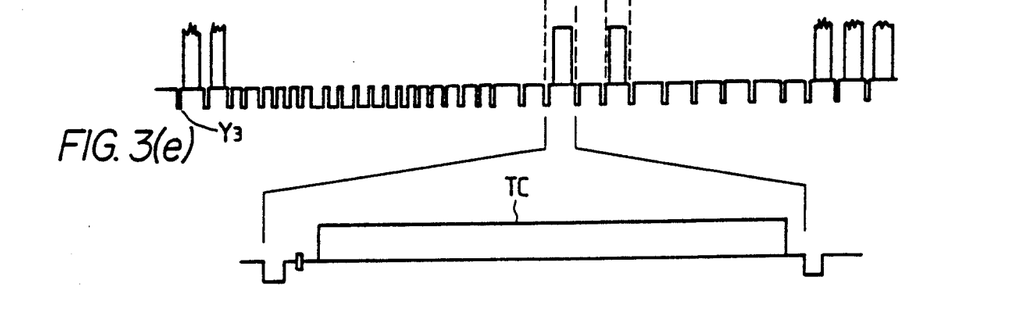

The above-described operation will hereinafter be described in further detail with reference to FIGS. 2 and 3. FIG. 3 shows a timing chart for describing the operation. In the same drawing, the symbols of signals indicated at each signal waveform correspond to the same symbols as those in the embodiment shown in FIG. 1. FIG. 2 is a block diagram showing one embodiment of a controller of FIG. 1. In FIG. 2, the controller is provided with a counter 91, a decoder 92, a pulse generator 93, an OR circuit 94, an input terminal 95 for a horizontal synchronizing signal and an input terminal 96 for a vertical synchronizing signal, and terminals 97 and 98 for outputting control signals which control the blanking processor 8 and the time code generator 7 of FIG. 1, respectively. The signal indicated at $Y_1$ in FIG. 3 is an output signal from the Y/C separator 4 shown in FIG. 1. It is assumed that information signals IS such as signals for character multi-broadcasting and GCR signals are inserted in the period from $14_H$th to $19_H$th (H being called "horizontal scanning period" hereinafter) with respect to the signal $Y_1$ as shown in FIG. 3(a), out of a vertical blanking period a obtained by start counting from the beginning of the vertical blanking period, namely, 1stH. In the present embodiment, these information signals are eliminated by performing the blanking processing relative to a period $10_H$th to $20_H$th including these information signals. The time code TC is thereafter added—for example—to the respective periods of $12_H$th and $14_H$th. In FIG. 2, the counter 91 is initiated by a vertical synchronizing signal from the input terminal 96 and thereafter counts a horizontal synchronizing signal from the input terminal 95. The decoder 92 generates decode pulses at $10_H$th, $12_H$th, $14_H$th and $20_H$th upon receipt of outputs counted by the counter 91. Upon receipt of the decode pulses, the pulse generator 93 generates pulses during the period of $10_H$th to $20_H$th as indicated at the control signal $CNT_1$ of FIG. 3(b). The pulses thus generated are outputted as a control signal for the blanking processor 8, to the output terminal 97. In addition, the OR circuit 94 performs logical addition of the decode pulse at $12_H$th and the decode pulse at $14_H$th from the decoder 92 and the resultant pulses are outputted to the output terminal 98 as control signals for the time code generator 7. The control signals are indicated at $CNT_2$ of FIG. 3(d). In the embodiment shown in FIG. 1, upon receipt of the control signal $CNT_1$, the blanking processor 8 performs the blanking processing of the period of $10_H$th to $20_H$th relative to the input signal $Y_1$. As a consequence, the information signals such as those for the character multi-broadcasting and GCR signals, which have been inserted in the period of $10_H$th to $20_H$th, are eliminated. The resultant signals are indicated at $Y_2$ of FIG. 3(c). Further, the time code generator 7 generates the time code TC at each of $12_H$th and $14_H$th upon receipt of the control signal $CNT_2$. The time code TC is then supplied to the time code mix circuit 9 to be added to the signal $Y_2$. The resultant signals are indicated at $Y_3$ of FIG. 3(e).

According to the present embodiment, after elimination of other information signals which have already been inserted, the time code is applied in the vertical blanking period of the video signals during which the time code is to be inserted. Thereafter, such signals identified by the time code are recorded in a recording medium. A correct reading of the time code can therefore be performed without being adversely affected by other signals (such as GCR signals and signals for the character broadcasting) adjacent to the time code when the signals are reproduced to read out the time code.

In addition, the GCR signals which appear during the vertical blanking period are only erased by the blanking processor 8. As an alternative to the GCR signals, the time code may be added to each position where the GCR signals have been inserted. As a consequence, GCR signals which have no direct relation to the recording of the video signals are eliminated and the time code is then added to the remaining signals including signals for the character broadcasting or the like, whereby the recording of information signals can be performed.

Figure 4:
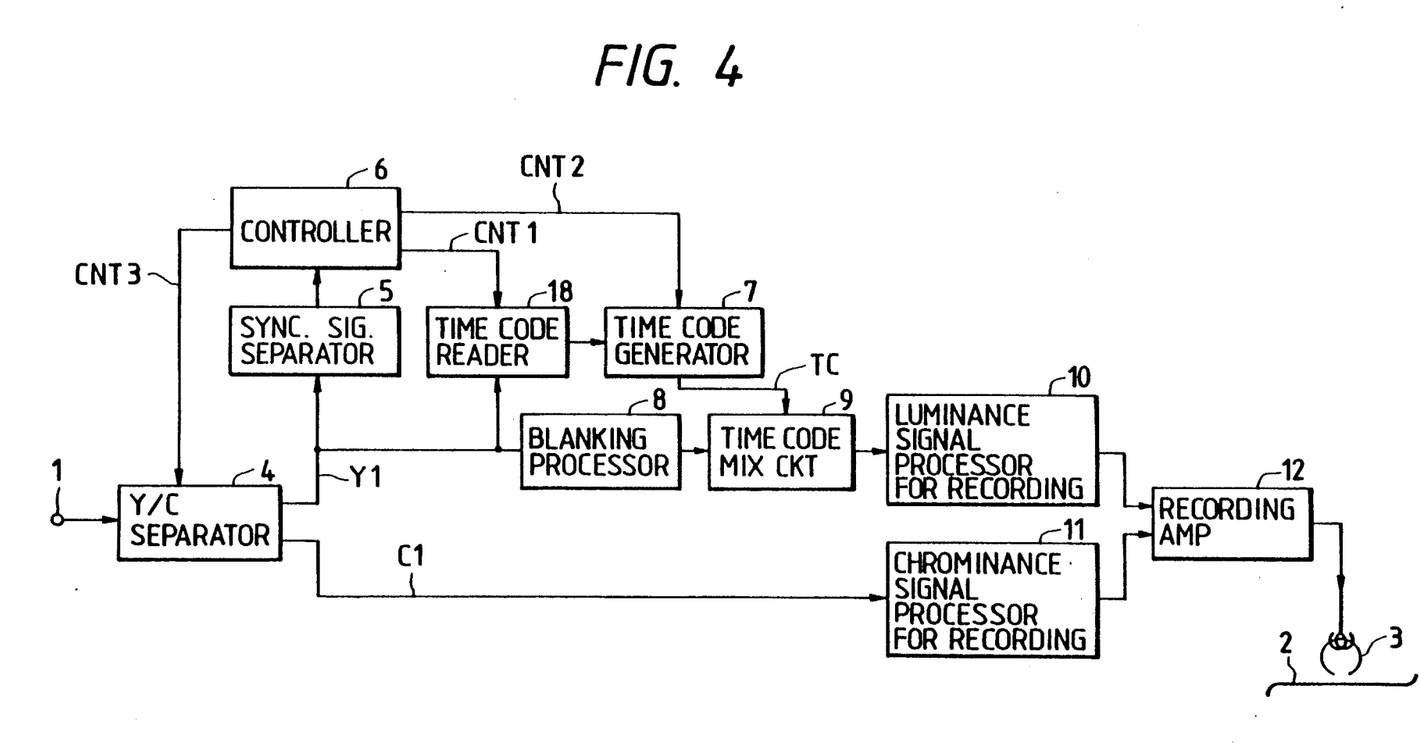
FIG. 4 is a block diagram showing a practical embodiment of FIG. 1.

FIG. 4 is a block diagram showing a practical embodiment of FIG. 1. Where a time code has been applied in the vertical blanking period of a luminance signal separated by a Y/C separator 4, the time code is read out and at the same time the new time code identical to that referred to above is applied again at a position where the previous time code has been applied; in other words, replacement of the time code with the new time code is executed. As a consequence, the present embodiment can prevent malfunction caused by a waveform distortion of the time code prior to its replacement.

In the same drawing, designated at numeral 18 is a time code reader for reading a time code from a signal outputted from the Y/C separator 4. The time code reader is constructed so that the time code can be read upon receipt of the control signal $CNT_1$ from the controller 6. The controller 6 is initiated with a vertical synchronizing signal from a sync signal separator 5 and thereafter counts a horizontal synchronizing signal from the sync signal separator 5. Further, the controller 6 is constructed so that a control signal $CNT_1$ for setting a time code reader 18 to a readable state is outputted during the presence of the counted values for the duration of time intervals from, for example, $10_H$th to $20_H$th and a control signal $CNT_2$ for setting a time code generator 7 to a state such that a desired time code is generated, is also outputted at, for example, $12_H$th and $14_H$th at which the time code has been inserted. The controller 6 also outputs a control signal $CNT_3$ for forcibly discontinuing separation processing of the Y/C separator 4 during the vertical blanking period or a period during which information signals such as a time code have been applied.

Where a comb-shaped filter which makes use of the correlation between a vertical direction and a time-base direction relative to a luminance signal is employed as the Y/C separator 4, a waveform distortion arises in a signal free of the correlation as in a time code. In this case, the above-described waveform distortion can therefore be eliminated by forcibly discontinuing the separation processing of the Y/C separator 4 during the vertical blanking period or a period in which binary-coded signals such as a time code have been applied.

Incidentally, the elements of structure not described herein are constructed in the same manner as those in the example depicted in FIG. 1 and the description of such elements will therefore be omitted herein.

Since the replacement of the time code with a new time code can be performed in the present embodiment, waveform distortion, which appears in each of the time code signals applied to the video signals to be inputted, can be reduced. In addition, waveform distortion of the time code signals caused by Y/C separation processings of the inputted video signals can also be reduced.

Furthermore, where used in combination with a reproducing or playback system to be described subsequently, the recording system and the reproducing system can be combined with or used as an alternative to the time code generator 7, the time code reader 18 and the time code mix circuit 9. As a consequence, an increase in the dimensions of the circuit can be reduced.

Figure 5:
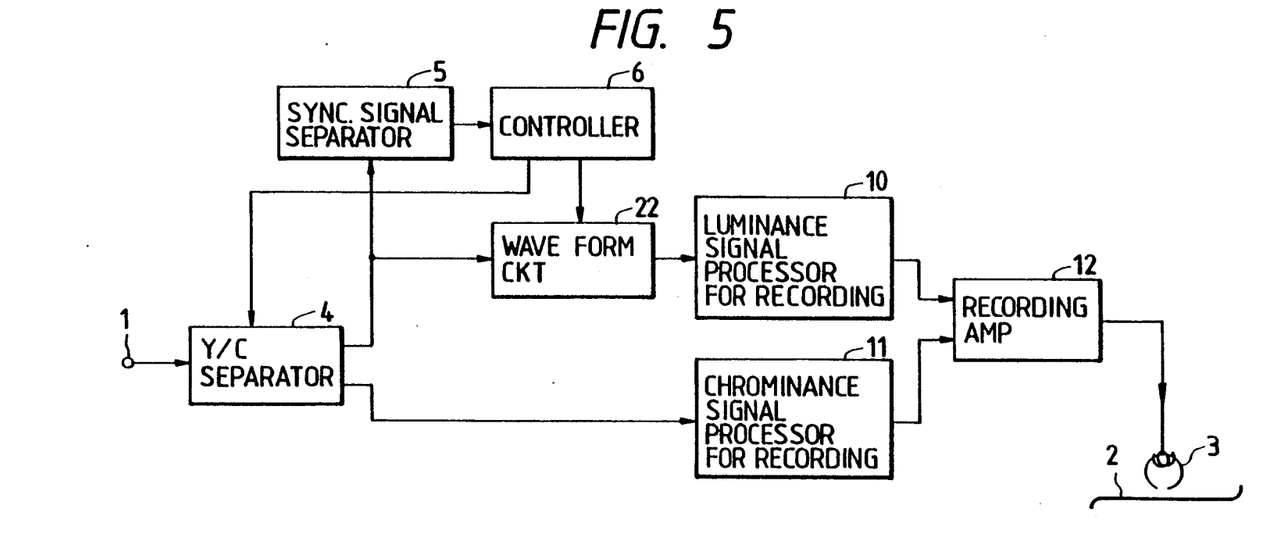
FIG. 5 is a block diagram of a video signal processor including a recording system according to another embodiment of this invention.

FIG. 5 is a block diagram of a video signal processor including a recording system according to another embodiment of this invention. In the present embodiment, there is provided a wave form circuit 22 for performing correction of waveform distortions of time code signals which appear at an output stage of a Y/C separator 4.

In the same drawing, a controller 6 brings a luminance signal from the Y/C separator 4 into the wave form circuit 22 so as to permit shaping of waveforms of time code signals during the vertical blanking period or for the duration of time intervals, i.e., periods of occurrence of the time code signals.

Figure 6:
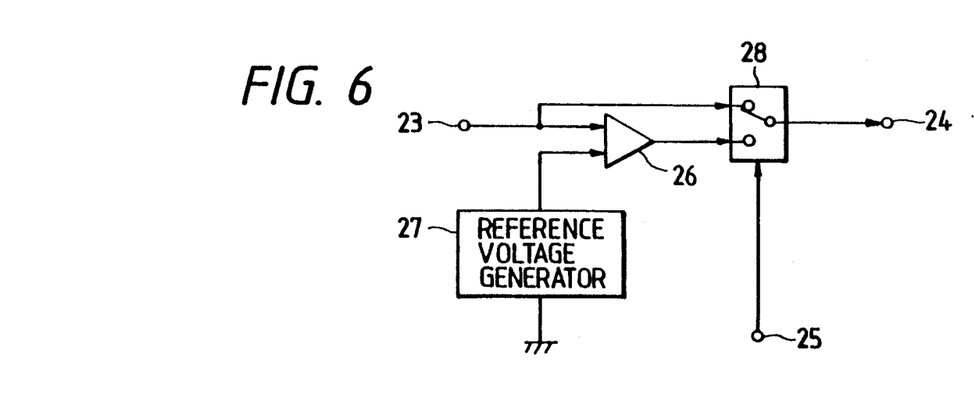
FIG. 6 is a block diagram showing one example of a wave form processor of FIG. 5.

The wave form circuit 22 can be realized by a construction of a circuit such as shown in FIG. 6, by way of example. Referring to FIG. 6, designated at numeral 23 is an input terminal for a video signal prior to a waveform shaping processing while numeral 24 indicates an output terminal for a video signal after completion of the waveform shaping processing. Numeral 25 indicates an input terminal for a control signal which is used to discriminate, i.e., determine whether the waveform shaping processing is proper or not. Designated at numerals 26, 27 and 28 are a voltage comparator, a reference voltage generator and a switch, respectively. The video signal received at the input terminal 23 is supplied to the voltage generator 26 and is then compared with a reference voltage from the reference voltage generator 27. As a result, the signal obtained by comparison is outputted to the switch 8. The control signal from the controller 6 is inputted to the switch 28 as a changeover signal of the switch 28 by way of terminal 25 so as to select either one of the output from the voltage comparator 26 and the video signal from the input terminal 23, whereby either one of them is outputted to the output terminal 24. The output signal is supplied to the luminance signal processor 10 for recording. The circuit operations of other elements are the same as those in the embodiment of FIG. 4 and the description of the operations will therefore be omitted herein.

A waveform distortion which appears in information (binary-coded) signals such as a time code applied to the input signals can be reduced by a waveform shaping processing in the present embodiment.

Figure 7:
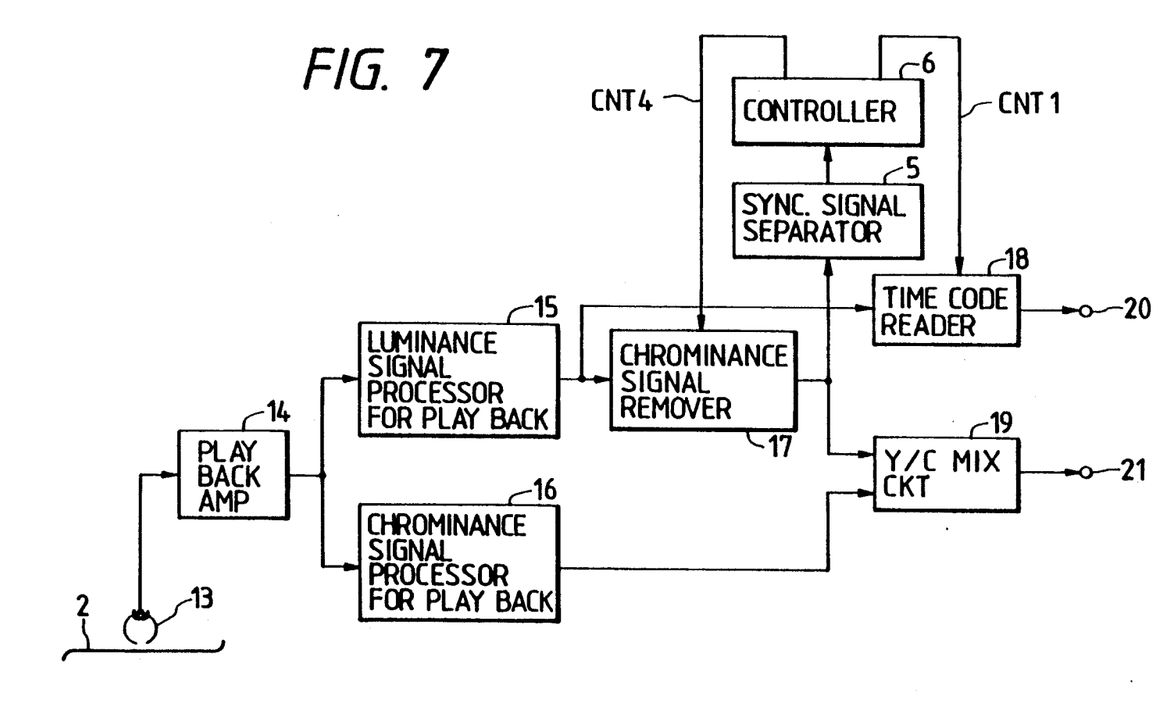
FIGS. 7 through 9 are block diagrams of video signal processors including a playback system according to further embodiments of this invention respectively.

FIG. 7 is a block diagram of a video signal processor including a playback system according to one embodiment of this invention.

It is assumed that video signals to which a time code has been inserted in a vertical blanking period have been recorded on a magnetic tape 2 in FIG. 7. A reproducing signal obtained from the magnetic tape 2 by way of a playback head 13 and a playback amplifier 14 is supplied to a luminance signal processor 15 for playback and a chrominance signal processor 16 for playback. These processors 15 and 16 perform reverse conversion processings of the luminance signal processor 10 for recording and the chrominance signal processor 11 for recording shown in FIG. 1, respectively. Designated at numeral 17 is a chrominance signal remover for removing components, as a chrominance signal or noise components which have entered by leakage the luminance signal from the luminance signal processor 15 for playback. It has generally been known that such a remover utilizes a comb-shaped filter which makes use of the correlation between the vertical direction and the time-base direction relative to the luminance signal which employs a scanning line or a delay line for a field. The luminance signal obtained by removing the components of the chrominance signal by the chrominance signal remover 17 is added to a chrominance signal from the chrominance signal processor 16 for playback by a Y/C mix circuit 19 so as to output the thus added signal to an output terminal 21. As a consequence, the video signals recorded on the magnetic tape 2 are reproduced to be outputted to the output terminal 21. Upon reading of the time code, the signal prior to passage of the chrominance signal remover 17, which is outputted from the luminance signal processor 15 for playback, is supplied to the time code reader 18. At this time, the time code reader 18 reads a time code which has been located at a predetermined position relative to the vertical blanking period to output the time code thus read to an output terminal 20.

Since time code signals have no correlation between the vertical direction and the time-base direction, a waveform distortion takes place as a result of processings of the above chrominance signal remover 17. However, a reading malfunction due to the waveform distortion can be eliminated because the time code signals are read through the luminance signal prior to the passage of the chrominance signal remover 17 in the present embodiment.

In the present embodiment, the chrominance signal remover 17 is controlled so that it is rendered off-state by making use of a control signal $CNT_4$ from the controller 6 during the vertical blanking period, whereby the components of the chrominance signal in a luminance signal system are assuredly eliminated.

Figure 8:
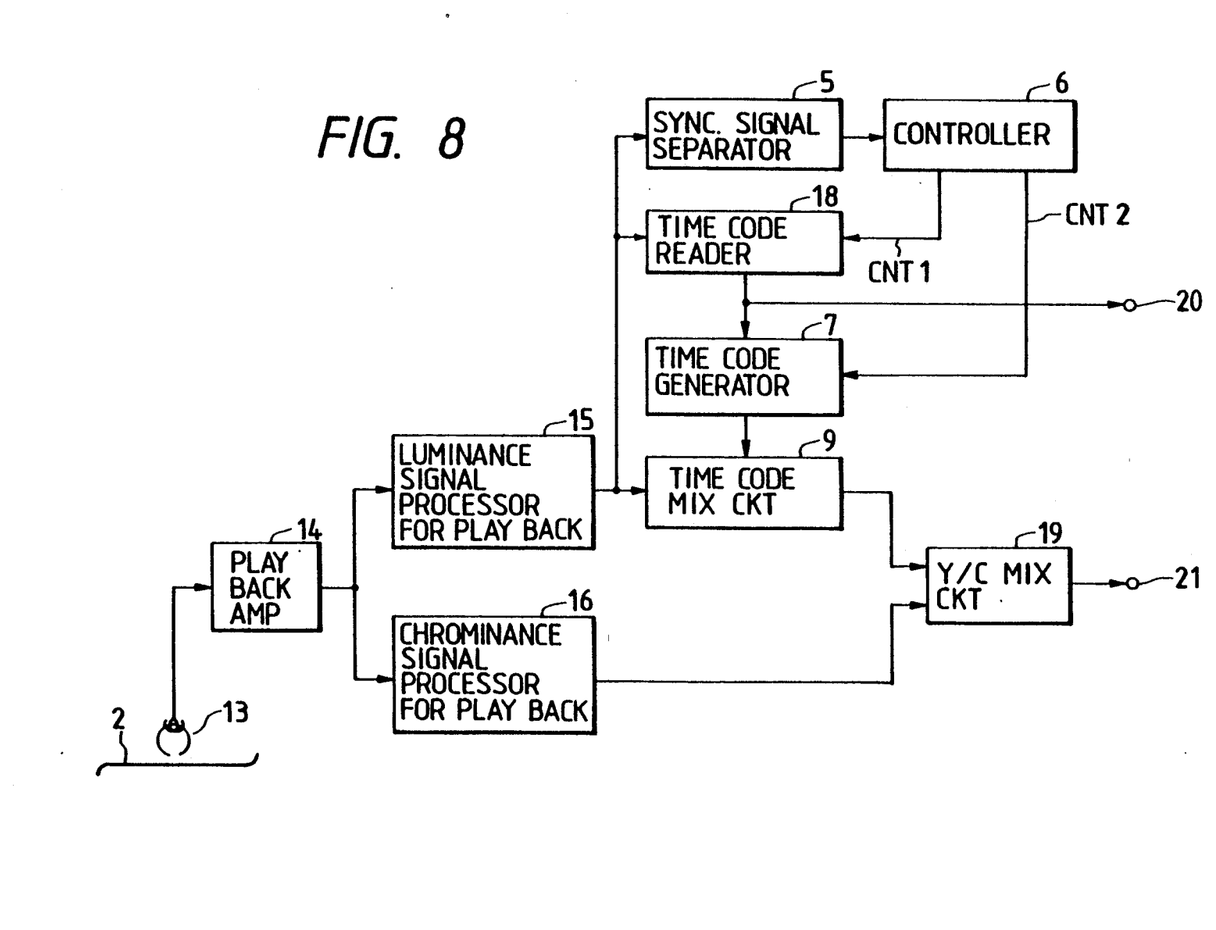

FIG. 8 is a block diagram of a video signal processor including a playback system according to another embodiment of this invention. In the same drawing, the same elements of structure as those in the embodiments shown in FIGS. 1 and 7 will hereinafter be identified by like reference numerals.

Referring to FIG. 8, a luminance signal from a luminance signal processor 15 for playback is supplied to a time code reader 18 at which a time code is read. The time code read is outputted to an output terminal 20 and also supplied to a time code generator 7. The time code generator 7 generates the same time code as that read by the time code reader 18, so that its time code is added to a reproduced video signal by a time code mix circuit 9. The circuit operations of other elements are the same as those in the embodiment of FIG. 7 and their description will therefore be omitted herein.

In the present embodiment, the time code which has been applied to the reproduced video signal is read and a new time code can be applied again at the same position as that in the preceding time code as an alternative to the previous time code. Therefore, it is possible to reduce malfunctions due to a waveform distortion of the time code whose distortion is caused by the recording or reproducing processing or the like. In addition, the present embodiment performs processings for the reproducing system. However, in an apparatus in which the processings for the reproducing system are combined with the processings for such recording system as shown in the embodiment of FIG. 1, by way of example, a combination with the former system and the latter system can be used both as the time code generator 7 and the time code mix circuit 9, so that an increase in the dimensions of the circuit can be avoided.

Figure 9:
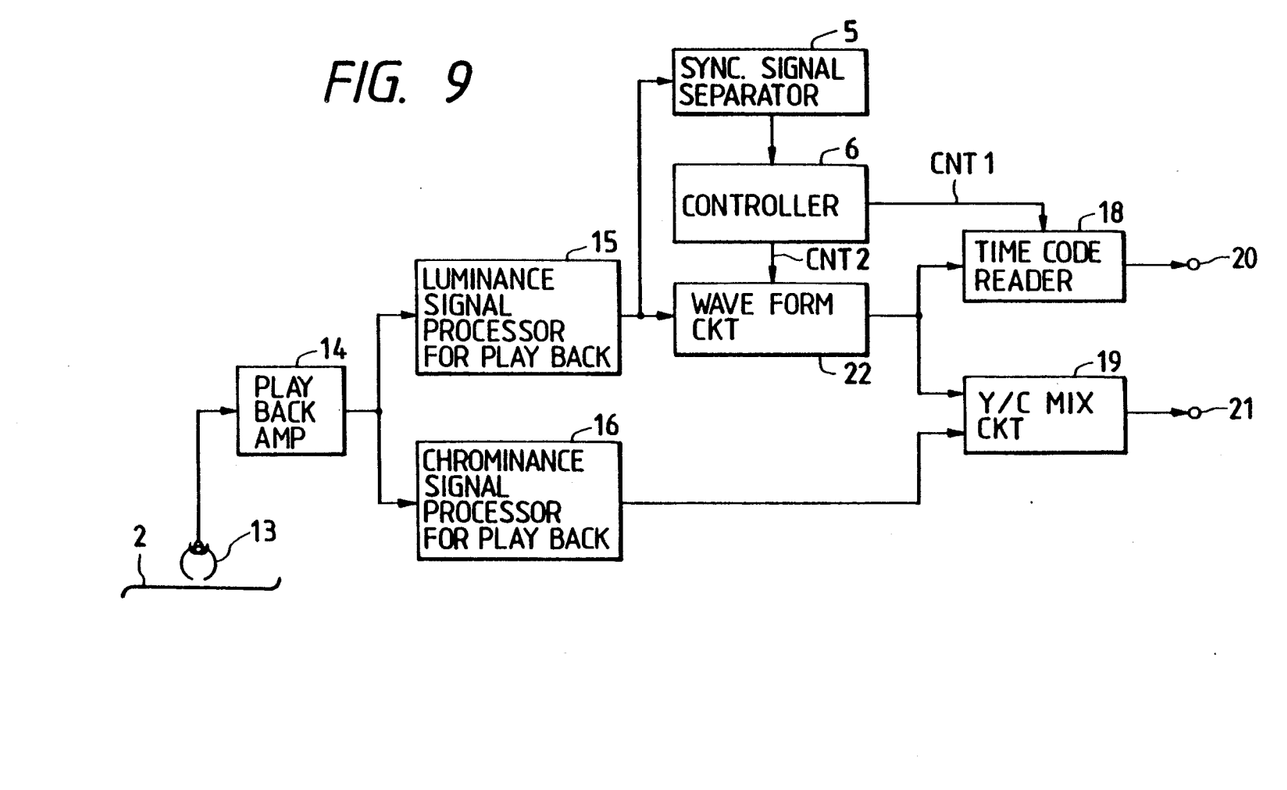

FIG. 9 is a block diagram of a video signal processor including a playback system according to a further embodiment.

Referring to FIG. 9, a signal, i.e., a luminance signal from a luminance signal processor 15 for playback is supplied to a wave form circuit 22. A controller 6 detects a vertical blanking period or a position at which a time code is to be applied, by a synchronizing signal separated by a sync signal separator 5 and also controls the wave form circuit 22 in such a way that waveform shaping processing is performed only during the time intervals referred to above. An output from the wave form circuit 22 is supplied to a time code reader 18 and also to a Y/C mix circuit 19, followed by the addition of the output to a reproduced chrominance signal from a chrominance signal processor 16 for playback so as to feed the thus added output to an output terminal 21. The circuit operations of other elements are the same as those in the embodiment of FIG. 7 and the description of the operations will therefore be omitted herein.

Since the waveform shaping of the time code which has been inserted in the reproduced video signal can be performed by the above-described operation, a distortion (i.e., a so-called rounding of the waveform), which is produced at a leading edge or a trailing edge of the waveform or the like, can be reduced. If the processing similar to that referred to above is applied to other binary-coded signals such as codes for a character broadcasting, the same effects can be brought about relative to these signals as well as the above case.

What is claimed is:

1. A video signal processor comprising:
an input terminal connected to receive a video signal;
a Y/C separator for separating the video signal received at the input terminal into a luminance signal and a chrominance signal and for outputting the luminance signal and the chrominance signal;
a sync signal separator connected to the Y/C separator for extracting a synchronizing signal from the luminance signal output by the Y/C separator;
a blanking processor connected to receive a first control signal and the luminance signal output by said Y/C separator;
a time code generator connected to receive a second control signal for generating a time code;
a controller which is responsive to the synchronizing signal extracted by said sync signal separator for outputting the first control signal for controlling said blanking processor and the second control signal for controlling said time code generator, said controller controlling said blanking processor by way of the first control signal so that said blanking processor removes information signals other than the synchronizing signal from the luminance signal inserted in a vertical blanking period of the received video signal, and further for controlling said time code generator by way of the second control signal so that the time code generated by said time code generator is inserted in the luminance signal from which the information signals have been removed;
a time code mix circuit connected to receive the time code generated by said time code generator and the luminance signal from which the information signals have been removed from said blanking processor for mixing the time code and the luminance signal from which the information signals have been removed, said time code mix circuit outputting a mixed signal resulting from the mixing of the time code and the luminance signal from which the information signals have been removed;
signal processing means for converting the mixed signal and the chrominance signal into signals suitable for recording, respectively, and for outputting the signals suitable for recording; and
means for amplifying at least one of the signals suitable for recording output by said signal processing means prior to recording said at least one signal.

2. A video signal processor as claimed in claim 1, wherein a time code reader responsive to the first control signal from the controller for reading a time code from the luminance signal output by said Y/C separator is provide at a stage prior to said time code mix circuit and the time code generator generates the same time code as that read by the time code reader upon the reading of the time code by said time code reader.

3. A video signal processor as claimed in claim 1, wherein said controller comprises a counter connected to the sync signal separator so that said counter is initialized by a vertical synchronizing signal output from said sync signal separator and thereafter counts a horizontal synchronizing signal from said sync signal separator, decode pulse generating means responsive to said counter for generating decode pulses at an initial timing and an end timing of the vertical blanking period and at a position where the horizontal synchronizing signal corresponds to the time code generated by said time code generator, and a control signal generator responsive to the decode pulses from said decode pulse generating means for generating the first and second control signals.

* * * * *